(12) United States Patent
Sathaye et al.

(10) Patent No.: US 12,236,281 B2
(45) Date of Patent: Feb. 25, 2025

(54) SYSTEM AND METHOD FOR A SYSTEM CONTROL PROCESSOR-CONTROLLED PARTITIONING OF BARE-METAL SYSTEM RESOURCES

(71) Applicant: Dell Products L.P., Round Rock, TX (US)

(72) Inventors: Sumedh Wasudeo Sathaye, Austin, TX (US); Gaurav Chawla, Austin, TX (US); John S. Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 563 days.

(21) Appl. No.: 17/471,263

(22) Filed: Sep. 10, 2021

(65) Prior Publication Data

US 2023/0081147 A1 Mar. 16, 2023

(51) Int. Cl.
  *G06F 9/50* (2006.01)
(52) U.S. Cl.
  CPC .................................. *G06F 9/5077* (2013.01)
(58) Field of Classification Search
  CPC ... G06F 9/5077; G06F 9/44505; G06F 9/5044
  See application file for complete search history.

(56) References Cited

U.S. PATENT DOCUMENTS

| | | | |
|---|---|---|---|
| 11,016,816 B1* | 5/2021 | Gupta | G06F 9/5088 |
| 2007/0180206 A1* | 8/2007 | Craft | G06F 11/1433 |
| | | | 714/E11.136 |
| 2010/0011368 A1* | 1/2010 | Arakawa | G06F 3/0665 |
| | | | 711/170 |
| 2013/0159910 A1* | 6/2013 | Bostic | G06F 11/323 |
| | | | 715/772 |
| 2016/0306649 A1* | 10/2016 | Gunti | G06F 9/4406 |
| 2019/0018710 A1* | 1/2019 | Ambardekar | G06F 9/45558 |
| 2020/0210203 A1* | 7/2020 | Madala | G06F 8/65 |
| 2020/0371846 A1* | 11/2020 | Halén | G06F 9/5083 |
| 2021/0117249 A1* | 4/2021 | Doshi | H04L 67/1001 |

\* cited by examiner

*Primary Examiner* — Dong U Kim
(74) *Attorney, Agent, or Firm* — Chamberlain, Hrdlicka, White, Williams & Aughtry; Aly Z. Dossa

(57) ABSTRACT

A method for providing bare-metal (BMS) resources includes receiving, by a system control processor, a partitioning request from a system control processor manager that specify a quantity of physical partitions, in response to the partitioning request: identifying a set of physical partitions of a bare-metal system (BMS) that are capable of servicing the partitioning request based on the quantity of physical partitions, updating a partitioning configuration data structure based on the set of physical partitions and the virtual partition, and implementing the virtual partition based on the set of resources using the partitioning configuration data structure.

15 Claims, 10 Drawing Sheets

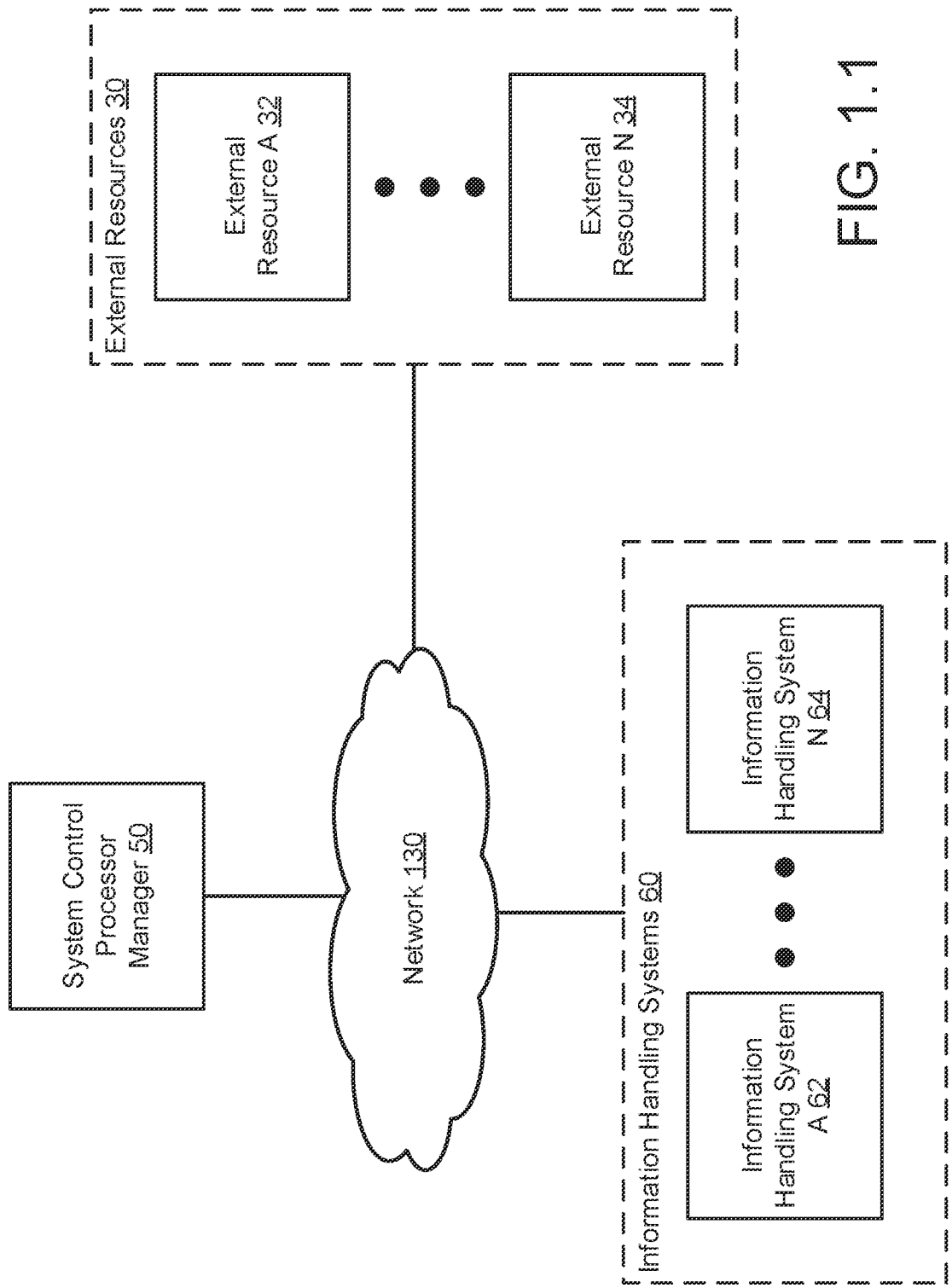
FIG. 1.1

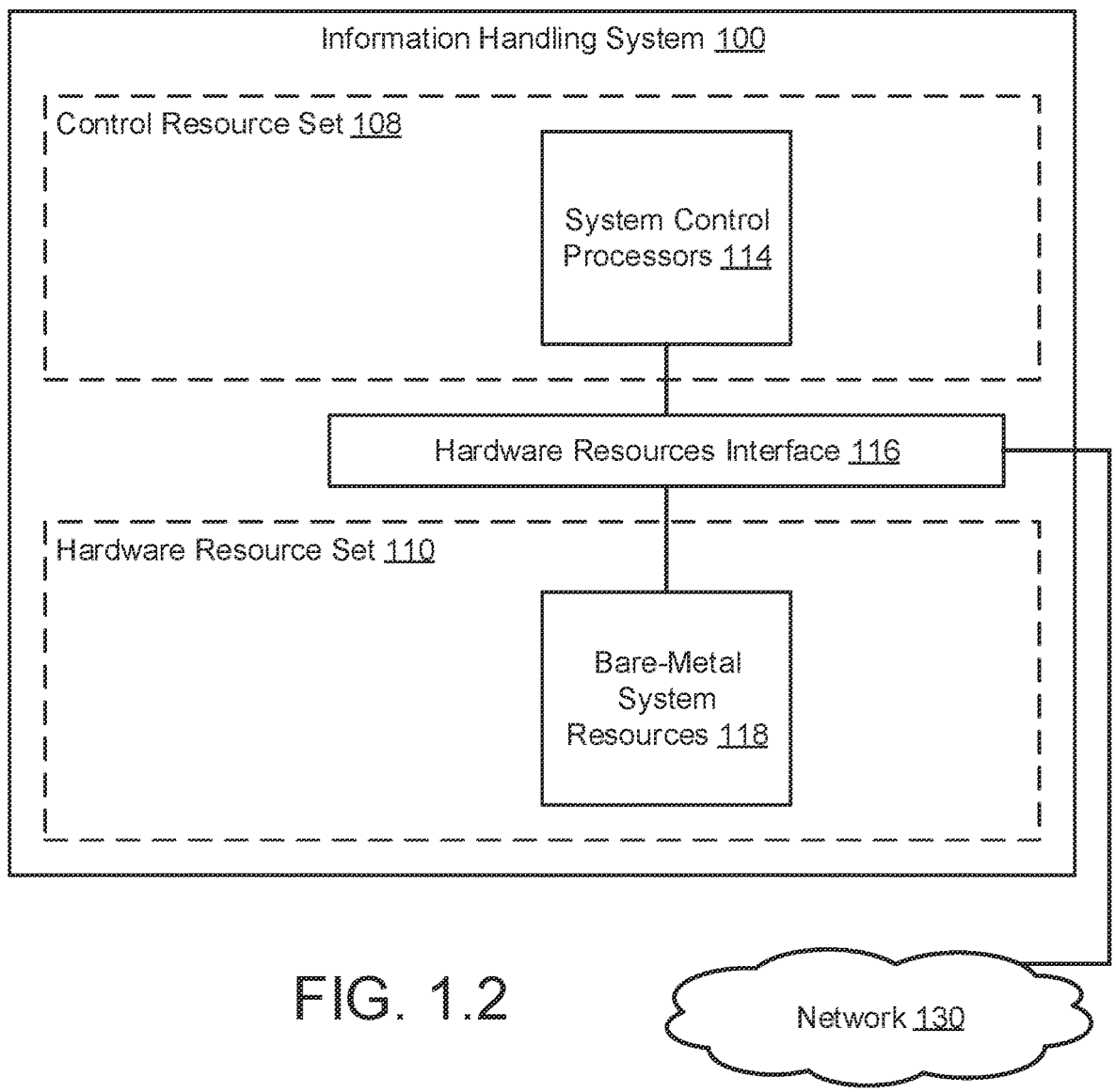
FIG. 1.2

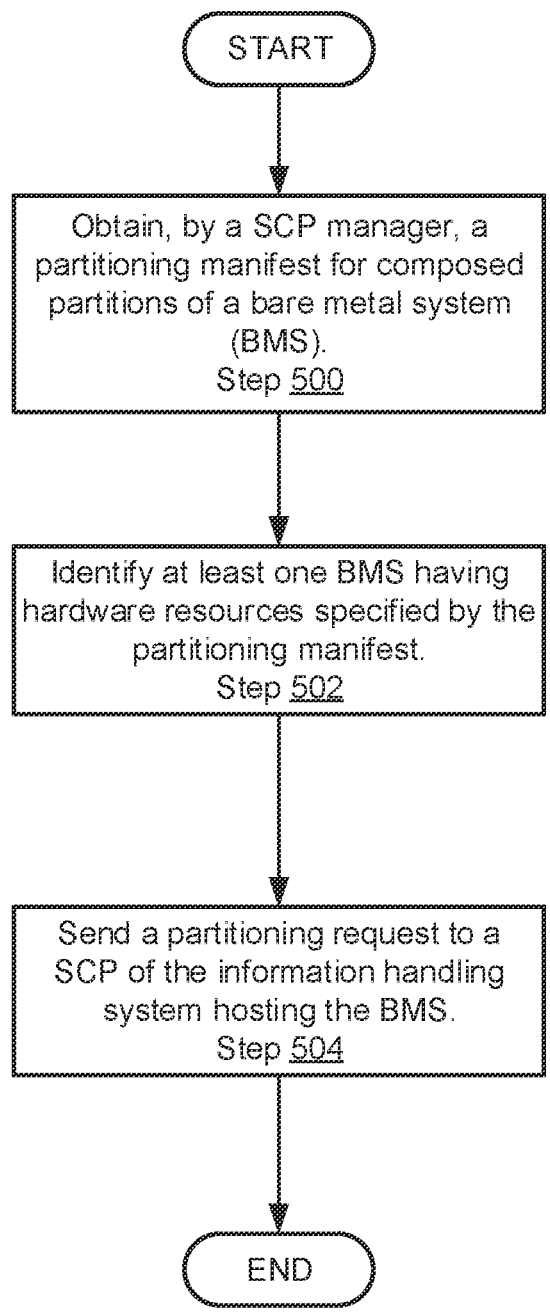
FIG. 5.1

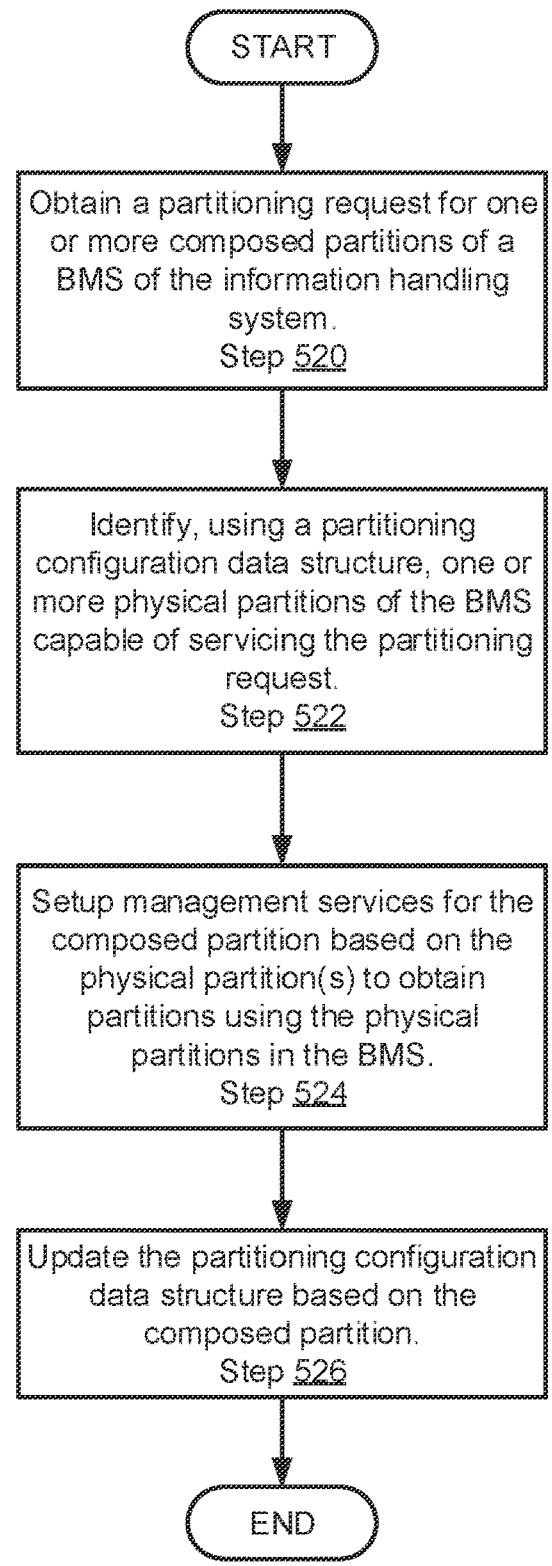
FIG. 5.2

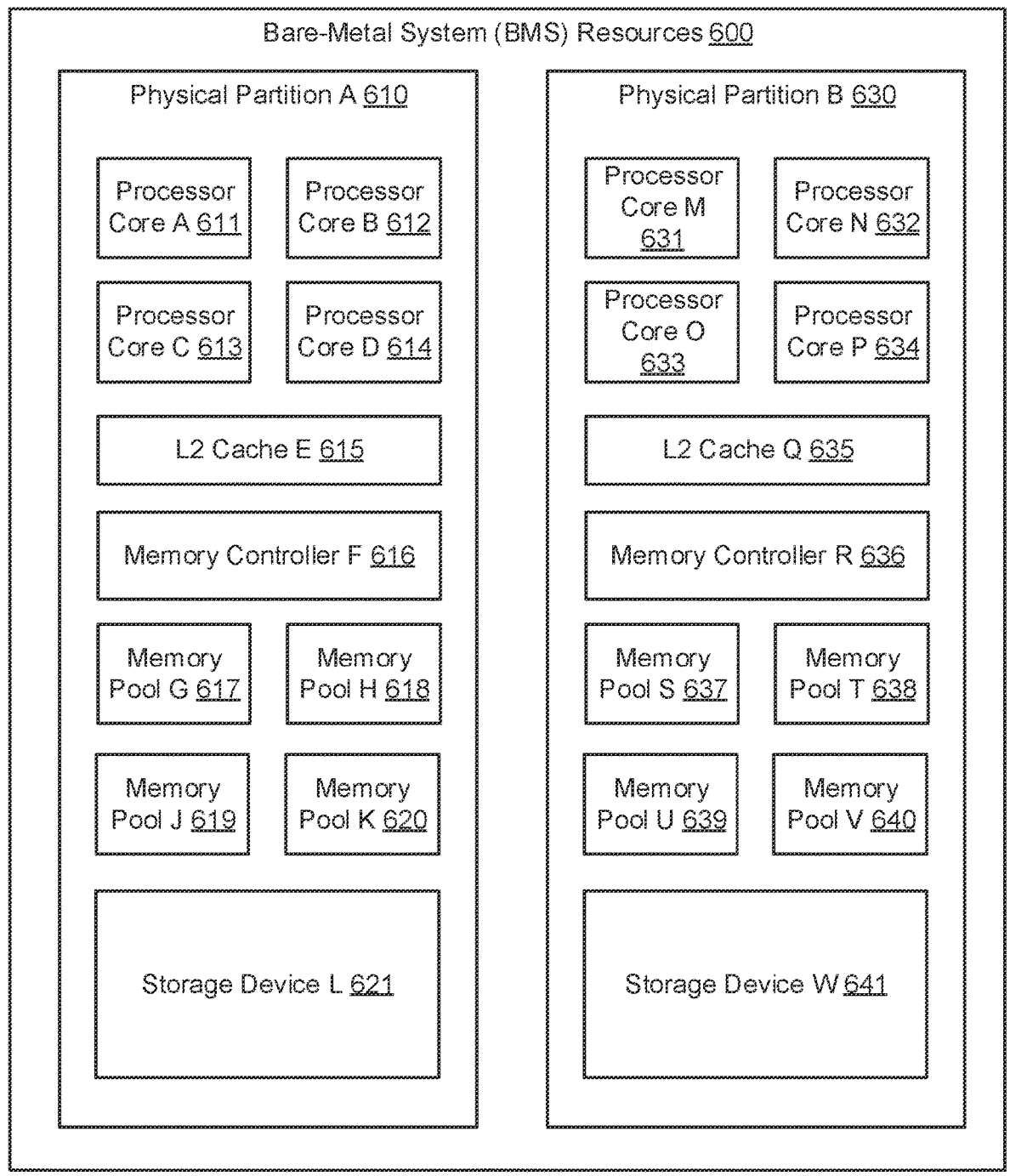
FIG. 6.1

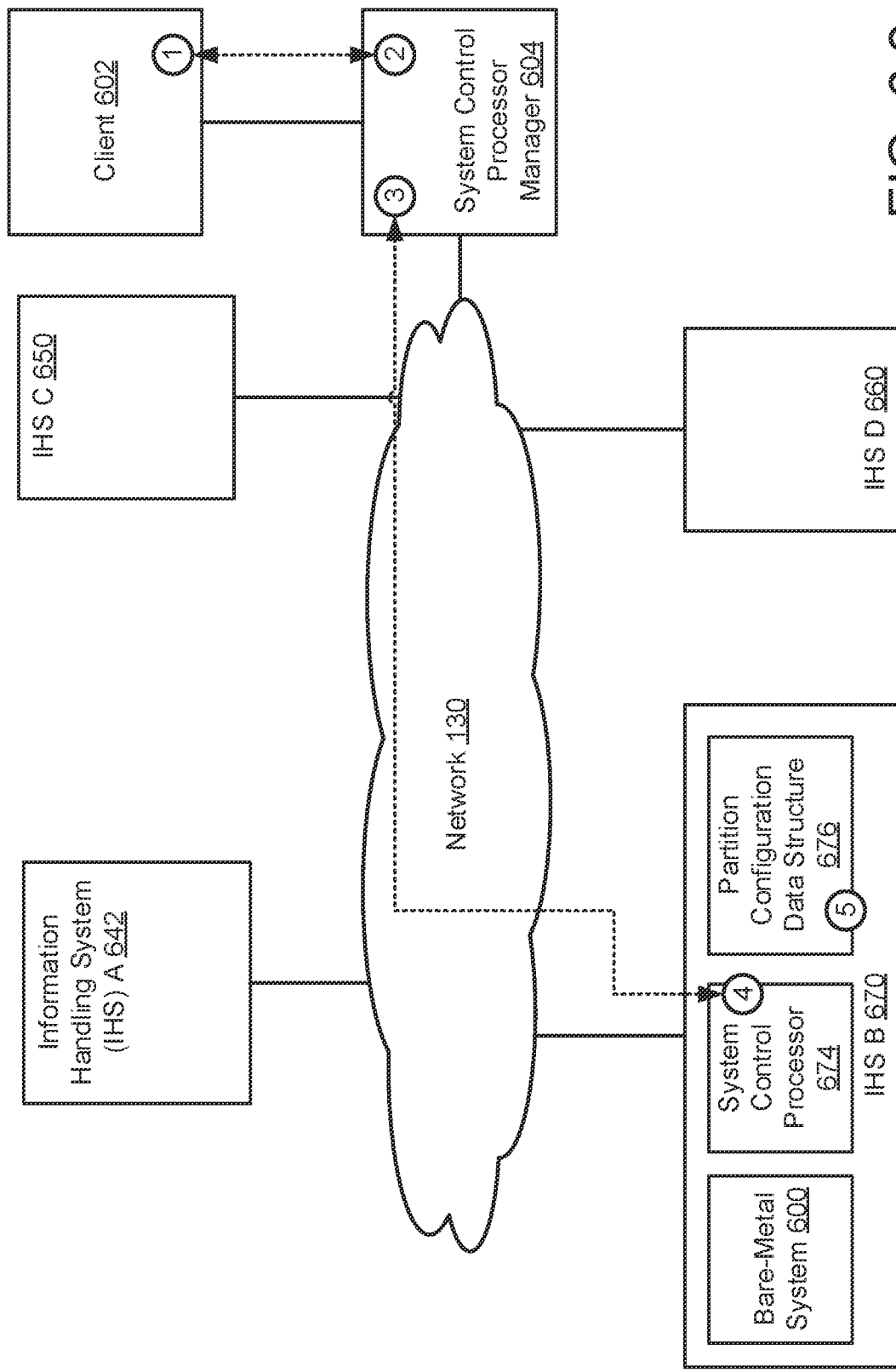
FIG. 6.2

SYSTEM AND METHOD FOR A SYSTEM CONTROL PROCESSOR-CONTROLLED PARTITIONING OF BARE-METAL SYSTEM RESOURCES

BACKGROUND

Computing devices may provide services. To provide the services, the computing devices may include hardware components and software components. The services provided by the computing devices may be limited by these components.

SUMMARY

In general, in one aspect, the invention relates to a system for providing bare-metal (BMS) resources that includes a system control processor, a BMS, and a partitioning configuration data structure. The system control processor is programmed to receive a partitioning request from a system control processor manager that specify a quantity of physical partitions, in response to the partitioning request: identify a set of physical partitions of the BMS that are capable of servicing the partitioning request based on the quantity of physical partitions, update the partitioning configuration data structure based on the set of physical partitions and the virtual partition, and implement the virtual partition based on the set of resources using the partitioning configuration data structure.

In general, in one aspect, the invention relates to a method for providing computer implemented services using information handling systems. The method includes receiving, by a system control processor, a partitioning request from a system control processor manager that specify a quantity of physical partitions, in response to the partitioning request: identifying a set of physical partitions of a bare-metal system (BMS) that are capable of servicing the partitioning request based on the quantity of physical partitions, updating a partitioning configuration data structure based on the set of physical partitions and the virtual partition, and implementing the virtual partition based on the set of resources using the partitioning configuration data structure.

In general, in one aspect, the invention relates to a non-transitory computer readable medium that includes computer readable program code, which when executed by a computer processor enables the computer processor to perform a method for dynamically instantiating composed partitions. The method includes receiving, by a system control processor, a partitioning request from a system control processor manager that specify a quantity of physical partitions, in response to the partitioning request: identifying a set of physical partitions of a bare-metal system (BMS) that are capable of servicing the partitioning request based on the quantity of physical partitions, updating a partitioning configuration data structure based on the set of physical partitions and the virtual partition, and implementing the virtual partition based on the set of resources using the partitioning configuration data structure.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of servicing a partitioning manifest in accordance with one or more embodiments of the invention.

FIG. 5.2 shows a flowchart of a method of initiating SCP partitioning of BMS resources in accordance with one or more embodiments of the invention.

FIGS. 6.1-6.2 shows diagrams of the operation of an example system over time in accordance with one or more embodiments of the invention.

DETAILED DESCRIPTION

Figure 2:
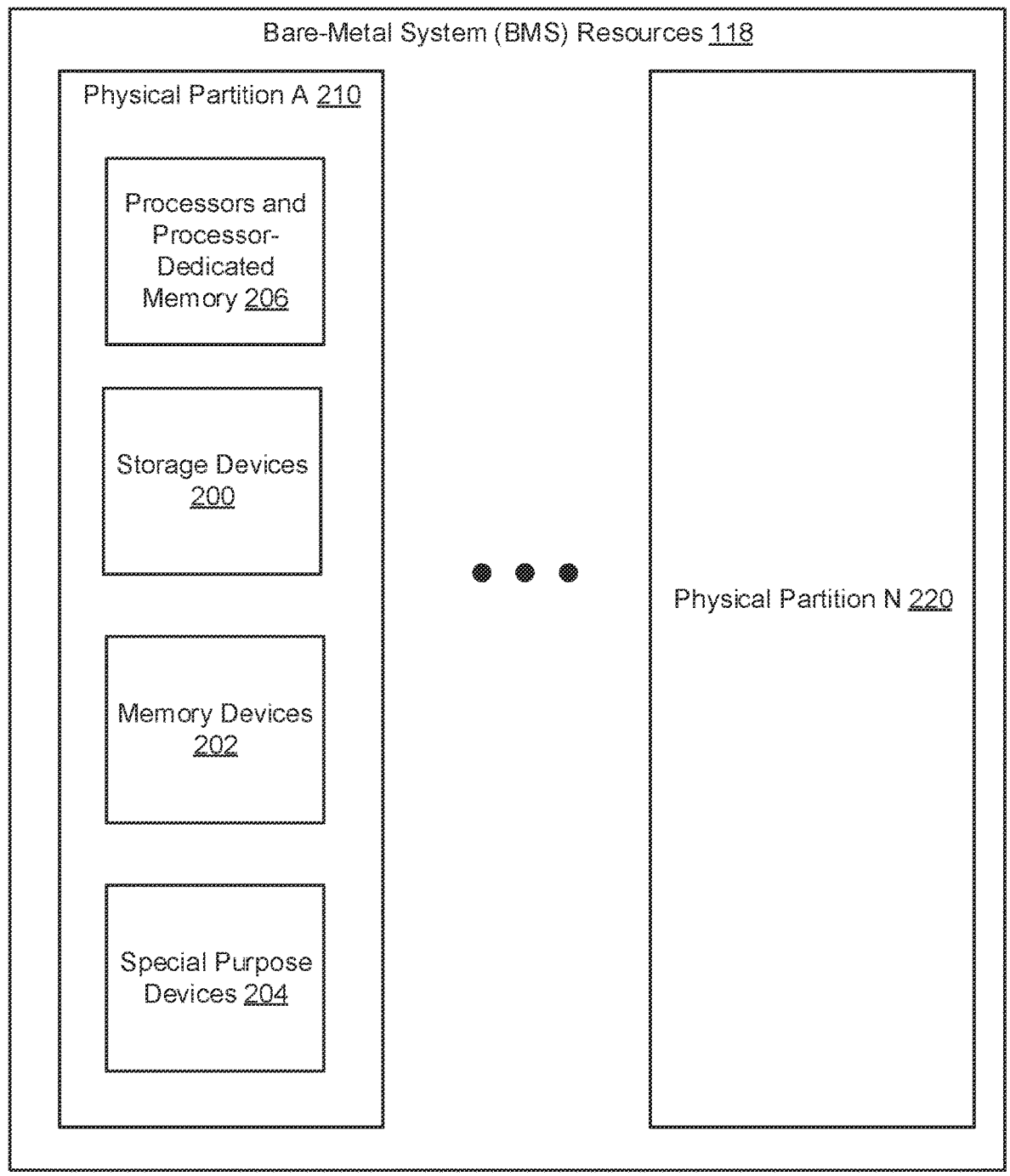
FIG. 2 shows a diagram of bare-metal system resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The services may include, for example, processing resources, memory, resources, storage resources, computing resources, etc.

To allocate the computing resources, physical partitions of a bare-metal system (BMS) may be allocated to perform services. The physical partitions may include a set of computing resources physically coupled to perform common services. An information handling system may host a BMS that includes any number of physical partitions. The information handling system may further include a system control processor that obtains partitioning requests from a system control processor manager. The system control processor may service the partitioning requests by identifying one or more physical partitions of the BMS to execute one or more application and/or provide one or more services requested in the partitioning request. The system control processor manager may translate the partitioning requests into corresponding quantities of physical partitions necessary to be allocated to satisfy the intent of the partitioning requests.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources are over-allocated for the computer implemented services. Similarly, the quality of the provided computer implemented services may be poor or otherwise undesirable if computing resources are under-allocated for the computer implemented services.

In general, embodiments of the invention relate to system, methods, and devices for managing the hardware resources of the information handling systems (60) and/or other resources (e.g., external resources (30)) to provide computer implemented services. The hardware resources of the information handling systems (60) may be managed by instantiating composed partitions using the hardware resources of the information handling systems (60), external resources (30), and/or other types of hardware devices operably connected to the information handling systems (60). Consequently, the computing resources allocated to a composed partition may be tailored to the specific needs of the services that will be provided by the composed partition(s). In one or more embodiments, a composed partition includes any number of physical partitions of bare-metal systems. As an example, a physical partition may be a portion of the resources (e.g., processor cores with corresponding cache, memory controller with corresponding memory, storage, input/output (I/O) components, etc.) of a bare-metal system that are physically associated with one another as a group of connected hardware resources within the bare-metal system.

In one or more embodiments of the invention, the system includes a system control processor manager (50). The system control processor manager (50) may provide composition services. Composition services may include (i) obtaining partitioning manifests for composed partitions and (ii) determining the information handling systems that may be capable of instantiating the composed partitions. By doing so, instantiated composed partitions may provide computer implemented services in accordance with the partitioning manifests.

In one or more embodiments of the invention, the system control processor manager (50) instantiates composed partitions in accordance with allocation of physical partitions of an information handling system. As will be discussed in greater detail below, the physical partitions of an information handling system may be portions of a bare-metal system (BMS) that each information handling system (62, 64) hosts. The physical partitions may be logically grouped into resource sets. Each resource set may be allocated to a composed partition in accordance with partitioning requests sent to the information handling system (62, 64) by the system control processor manager (50). The partitioning request may specify the requirements of the composed partition (e.g., the computing resources needed to instantiate the composed partition). The composed partition may operate using the allocated physical partitions.

By logically grouping the computing resources of an information handling system into these resource sets, different quantities and types of computing resource may be allocated to each composed partition thereby enabling the resources allocated to the respective information handling system to match performed workloads. Further, dividing the computing resources in accordance with the logically grouped model may enable different resource sets to be differentiated (e.g., given different personalities) to provide different functionalities. Consequently, composed partitions may be composed on the basis of desired functionalities rather than just on the basis of aggregate resources to be included in the composed partition. For additional details regarding the system control processor manager (50), refer to FIG. 4.

In one or more embodiments of the invention, a composed partition is a device that is formed using all, or a portion, of the computing resources (i.e., physical partitions) of the information handling systems (60), the external resources (30), and/or other types of hardware devices operably connected to the information handling systems (60). The composed partition may utilize the computing resources allocated to it to provide computer implemented services. For example, the composed partition may host one or more applications that utilize the computing resources assigned to the composed partition. The applications may provide the computer implemented services.

To manage the allocation and operation of a resource set, the composed partition may include a system control processor. The system control processor of each information handling system may coordinate with the system control processor manager (50) to enable composed partitions to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed partitions. For additional details regarding the information handling systems (60), refer to FIG. 1.2.

The external resources (30) may provide computing resources that may be allocated for use by composed partitions. For example, the external resources (30) may include hardware devices that provide any number and type of computing resources. The composed partition may use these resource to provide their functionalities. Different external resources (e.g., 32, 34) may provide similar or different computing resources.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5.1 and 5.2. The system control processor manager (50), information handling systems (60), and/or external resources (30) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 62, 64) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed partitions. The composed partitions may provide the computer implemented services.

To provide computer implemented services, the information handling system (100) may include one or more system control processors (114), and any number of BMS resources (118). These hardware devices may be logically divided into a control resource set (108) and a hardware resource set (110).

The control resource set (108) of the information handling system (100) may facilitate formation of composed partitions. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., of the information handling system (100) and/or other information handling systems). Once prepared, the control resource set (108) may present the prepared resources as a composed partition to the processors of the allocated computing resources.

To prepare the resources of the hardware resource sets for presentation, the control resource set (108) may employ, for example, virtualization, indirection, abstraction, and/or emulation. These management functionalities may be transparent to applications hosted by the resulting instantiated composed partitions. Consequently, while unknown to the control plane entities of the composed partition, the composed partition may operate in accordance with any number of management models thereby providing for unified control and management of composed partitions. These functionalities may be transparent to applications hosted by composed partitions thereby relieving them from overhead associated with these functionalities.

For example, consider a scenario where a compute resource set is instructed to instantiate a composed partition including a compute resource set and a hardware resource set that will contribute storage resources to the compute resource set. The compute resource set may virtualize the storage resources of the hardware resource set to enable a select quantity of the storage resources to be allocated to the composed partition while reserving some of the storage resources for allocation to other composed partitions. However, the prepared storage resources may be presented to the compute resource set as a virtualized environment. Consequently, the compute resource set may not need to host any control plane entities or otherwise incur overhead for utilizing the virtualized storage resources.

In one or more embodiments of the invention, control plane entities (e.g., applications) such as hypervisors, emulators, and/or other types of management entities may be hosted (e.g., executed) by the processors utilizing the computing resources allocated to a composed partition.

For example, the processors may utilize mapped memory addresses to communicate with the bare metal resources presented by the system control processors (114) to the processors. The system control processors (114) may obtain these communications and appropriately remap (e.g., repackage, redirect, encapsulate, etc.) the communications to the actual hardware devices providing the computing resources, which the processors are interacting with via the hardware resources interface (116), discussed below. Alternatively, indirection, remapping, and/or other functions required for resource virtualization, emulation, abstraction, or other methods of resource allocation (other than bare metal) and manage may not need to be implemented via the processors.

By doing so, any number of functions for a composed partition may be automatically performed in a manner that is transparent to the control plane. Accordingly, a composed partition may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

In one or more embodiments of the invention, the utilization of the computing resources by the data plane entities may be managed by the system control processors (114). The management of the utilization may include storing information (e.g., configuration information) that specifies the computing resources (e.g., the physical partitions) allocated to the composed partition. The information may be stored in a partition configuration data structure (further discussed below in the description of FIG. 3).

The system control processors (114) may present any number of resources operably connected to it (e.g., the hardware resource set (110), other resources operably connected to it via an interface (e.g., hardware resources interface (116), etc.) as bare metal resources to the processors of the compute resource set. Consequently, the system control processors (114) may implement device discovery processes compatible with the processors to enable the processors to utilize the presented computing resources.

For example, the hardware resource set (110) may include BMS resources (118) operably connected to the system control processors (114) via a hardware resources interface (116). The BMS resources (118) may include any number and type of hardware devices that provide computing resources. The computing resources may be physically grouped via physical partitions. For additional details regarding the BMS resources (118) and/or physical partitions, refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented for the clients utilizing the composed partitions.

In an additional example, the system control processors (114) may be operably connected to external resources via hardware resources interface (116) and network (130). The system control processors (114) may prepare and present the external resources as for the clients utilizing the composed partitions.

Figure 3:
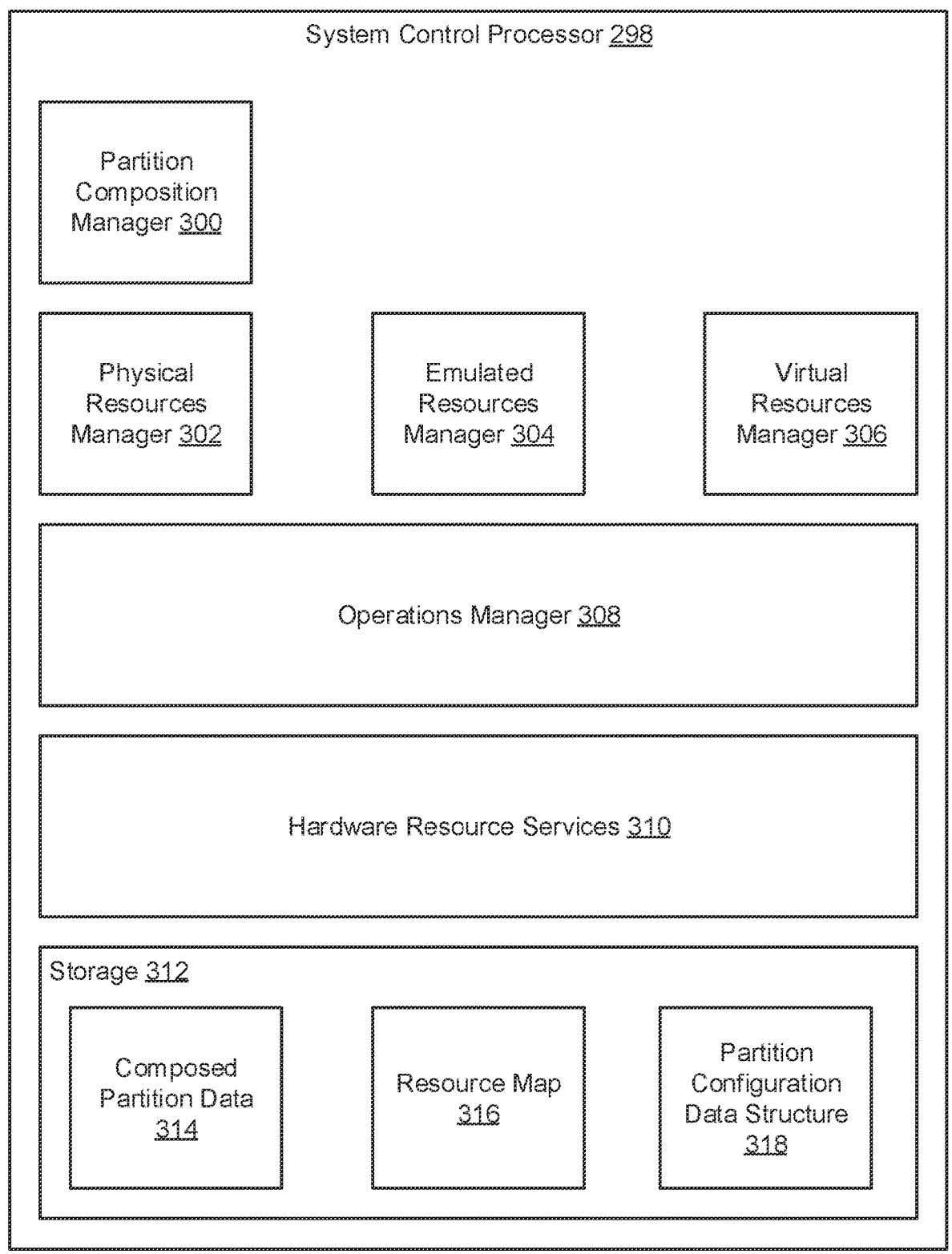
FIG. 3 shows a diagram of a system control processor in accordance with one or more embodiments of the invention.

For additional details regarding the operation and functions of the system control processors (114), refer to FIG. 3.

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the control resource set (108) and/or hardware resource set (110) may be implemented as separate physical devices. In such scenario, the hardware resources interface (116) may include one or more networks enabling these resource sets to communicate with one another. Consequently, any of these resource sets (e.g., 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors of the BMS (118). The system control processors (114) may also support a second network communications connection (e.g., an out-of-band connection) that may be allocated for use by applications hosted by the system control processors (114). The out-of-ban connection may be utilized for management and control purposes while the in-band connection may be utilized to provide computer implemented services. These connections may be associated with different network endpoints thereby enabling communications to be selectively directed toward applications hosted by the processors and/or system control processors (114). As will be discussed in greater detail with respect to FIG. 3, the system control processors (114) may utilize the out-of-band connections to communicate with other devices to manage (e.g., instantiate, monitor, modify, etc.) composed partitions.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.2. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of bare-metal system resources (118) in accordance with one or more embodiments of the invention. As noted above, system control processors of information handling system may present resources including, for example, some of the BMS resources (118) to form a composed partition.

The BMS resources (118) may include one or more physical partitions (210) that include any number of hardware devices that may provide any quantity and type of computing resources. For example, a physical partition (210, 220) of the BMS resources (118) may include processors and processor dedicated memory (206), storage devices (200), memory devices (202), and special purpose devices (204).

The physical partitions (210) may include one or more processors operably connected to processor dedicated memory (206). Consequently, the physical partitions (210, 220) may host any number of executing processes thereby enabling any number and type of workloads to be performed. When performing the workloads, the processors and processor-dedicated memory (206) may utilize additional computing resources provided by the physical partitions (210, 220). The processors may be implemented as, for example, processing cores that each execute any portion of the processes. The processor-dedicated memory may be implemented as, for example, L2 or L3 cache.

The storage devices (200) may provide storage resources (e.g., persistent storage) in which applications hosted by a composed partition may store data including any type and quantity of information. The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed partition may store data including any type and quantity of information. The memory devices (202) may include any type and quantity of devices for storing data. The devices may include, for example, transitory memory such as random access memory, persistent memory such as enterprise class memory, etc.

The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, network resources, etc.) to composed partitions. The special purpose devices (204) may include any type and quantity of devices for providing other types of computing resources. The special purpose devices (204) may include, for example, graphics processing units for providing graphics processing resources, compute accelerators for accelerating corresponding workloads performed by composed partitions, application specific integrated circuits (ASICs) for performing other functionalities, digital signal processors for facilitating high speed communications, etc. As another example, the special purpose devices (204) may include one or more network interface cards (NICs) for providing network functionality (e.g., network connectivity, network traffic processing, etc.). The special purpose devices (204) may include other types of devices for providing other types of computing resources without departing from the invention.

In one or more embodiments of the invention, the hardware resources of a physical partition (210, 220) may be grouped based on the physical and/or electrical layout of the resources. For example, a first physical partition may include a group of any number of processing cores that utilize similar connections to connect to a memory controller, L2 and/or L3 cache, and any number of memory modules. In this example, the grouping of the processing cores, the cache, the memory controller, and the memory modules may be referred to as a physical partition. The grouping of the hardware resources to obtain physical partitions may be performed using any grouping mechanism without departing from the invention.

While the hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed partitions. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed partitions. By doing so, a system that includes information handling systems may dynamically instantiate composed partitions to provide computer implemented services.

To instantiate and operate composed partitions, the system control processor (298) may include a partition composition manager (300), a physical resources manager (302), an emulated resources manager (304), a virtual resources manager (306), an operation manager (308), hardware resource services (310), and storage (312). Each of these components of the system control processor is discussed below.

The partition composition manager (300) may manage the process of instantiating and operating composed partitions. To provide these management services, the partition composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain partition requests for composed partitions, (iv) based on the partition requests, prepare the partitioning of the BMS, (v) instantiate applications in composed partitions to cause the composed partitions to provide computer implemented services, conform their operation to security models, etc., (vi) manage the operation of the composed partitions by, for example, storing the partition configuration in the partition configuration data structure (318), (vii) add/remove/modify physical partitions presented to the clients utilizing composed partitions dynamically in accordance with workloads being performed by the composed partitions, and/or (viii) coordinate with other system control processors to provide distributed system functionalities. By providing the above functionalities, a system control processor in accordance with one or more embodiments of the invention may enable distributed resources from any number of information handling systems to be aggregated into a composed partition to provide computer implemented services.

To obtain information regarding the hardware components of the information handling system, the partition composition manager (300) may inventory the components of the information handling system hosting the system control processor. The inventory may include, for example, the type and model of each physical partition, versions of firmware or other code executing on the hardware components, and/or information regarding physical partitions of the BMS that may be allocated to form composed partitions.

The partition composition manager (300) may obtain partition requests from other entities (e.g., a system control processor manager), as pre-loaded instructions present in storage of the system control processor, and/or via other methods. The partition requests may specify, for example, the types and quantities of physical partitions to be allocated to a composed partition.

In one or more embodiments of the invention, the partition requests specify the computing resource allocations using an intent-based model. For example, rather than specifying specific hardware devices (or portions thereof) to be allocated to a particular compute resource set to obtain a composed partition, the partition requests may only specify that a composed partition is to be instantiated having predetermined characteristics, that a composed partition will perform certain workloads or execute certain applications, and/or that the composed partition be able to perform one or more predetermined functionalities. In such a scenario, the partition composition manager may decide how to instantiate the composed partition (e.g., which physical partitions to allocate, how to allocate the resources (e.g., virtualization, emulation, redundant workload performance, data integrity models to employ, etc.), to which compute resource set(s) to present corresponding computing resources, etc.).

In one or more embodiments of the invention, the partition requests specify the computing resource allocations using an explicit model. For example, the partition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the partition requests may also specify, for example, applications to be hosted by the composed partitions, security models to be employed by the composed partitions, communication models to be employed by the composed partitions, services to be provided to the composed partitions, user/entity access credentials for use of the composed partitions, and/or other information usable to place the composed partitions into states in which the composed partitions provide desired computer implemented services.

To prepare and present resources to compute resource sets based on the partition requests, the system control processors may implement, for example, abstraction, indirection, virtualization, mapping, emulation, and/or other types of services that may be used to present any type of resources as a resource that is capable of bare metal utilization by compute resource sets. To provide these services, the partition composition manager (300) may invoke the functionality of the physical resources manager (302), the emulated resources manager (304), and/or the virtual resources manager (306).

Additionally, the system control processors may take into account the importance of completion of workloads when preparing and presenting resources. For example, some workloads that may be performed by various hardware devices may be critical (e.g., high availability workloads) to the computer implemented services to be provided by a composed partition. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed partition.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed partition providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a partition requests (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed partition.

By forming composed partitions as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide the composed partitions. By doing so, the system control processor (298) may address compatibility issues, sizing issues to match available resources to those that are to be allocated, and/or other issues to enable bare metal resources to be presented to compute resource sets.

When providing the composed partitions, the partition composition manager (300) may invoke the functionality of the physical resources manager (302), emulated resources manager (304), and virtual resources manager (306). Consequently, resources may be presented as bare metal resources via pass-through (i.e., forwarding TO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The partition composition manager (300), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, methods illustrated in FIGS. 5.1-5.2.

The system control processor (298) may be implemented using computing devices.

The computing devices may be, for example, an embedded computing device such a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.2. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), operation manager (308), and/or hardware resource services (310). The composition manager (300), physical resources manager (302), emulated resources manager (304), virtual resources manager (306), operation manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed partition data (314), a resource map (316), and a partition configuration data structure (318). Each of these data structures is discussed below.

The composed partition data (314) may be implemented using one or more data structures that includes information regarding composed partitions. For example, the composed partition data (314) may specify identifiers of composed partitions and resources that have been allocated to the composed partitions.

The composed partition data (314) may also include information regarding the operation of the composed partitions. The information may include, for example, workload performance data, resource utilization rates over time, and/or other information that may be utilized to manage the operation of the composed partitions.

The composed partition data (314) may further include information regarding management models employed by system control processors. For example, the composed partition data (314) may include information regarding duplicative data stored for data integrity purposes, redundantly performed workloads to meet high availability service requirements, encryption schemes utilized to prevent unauthorized access of data, etc.

The composed partition data (314) may be maintained by, for example, the partition composition manager (300). For example, the composition manager may add, remove, and/or modify information included in the composed partition data (314) to cause the information included in the composed partition data (314) to reflect the state of the composed partitions.

The data structures of the composed partition data (314) may be implemented using, for example, lists, tables, unstructured data, databases, etc. While illustrated in FIG. 3 as being stored locally, the composed partition data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed partitions. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The partition configuration data structure (318) may be implemented using one or more data structures that include information regarding the configuration for the composed partitions that include the physical partitions. The information may include, for example, the memory pools reserved for use by each composed partition, the processing cores to be reserved for the composed partition, and/or the memory controller of the physical partitions to perform the memory management for the operation of the composed partition.

The operations manager (308), partition composition manager (300), physical resources manager (302), the emulated resources manager (304), and/or virtual resources manager (306) may contribute to the storage of information in the partition configuration data structure (318). For example, any component of the system control processor (298) (e.g., the operations manager (308), partition composition manager (300), physical resources manager (302), the emulated resources manager (304), and/or virtual resources manager (306)) may update the partition configuration data structure (318) in accordance with FIG. 5.2.

The data structures of the partition configuration data structure (318) may be implemented using, for example, lists, tables, unstructured data, databases, etc. While illustrated in FIG. 3 as being stored locally, the partition configuration data structure (318) may be stored remotely and may be distributed across any number of devices without departing from the invention. Further, while illustrated as stored in storage (312), the partition configuration data structure (318) may be stored in memory and/or other volatile storage of the system control processor (298).

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
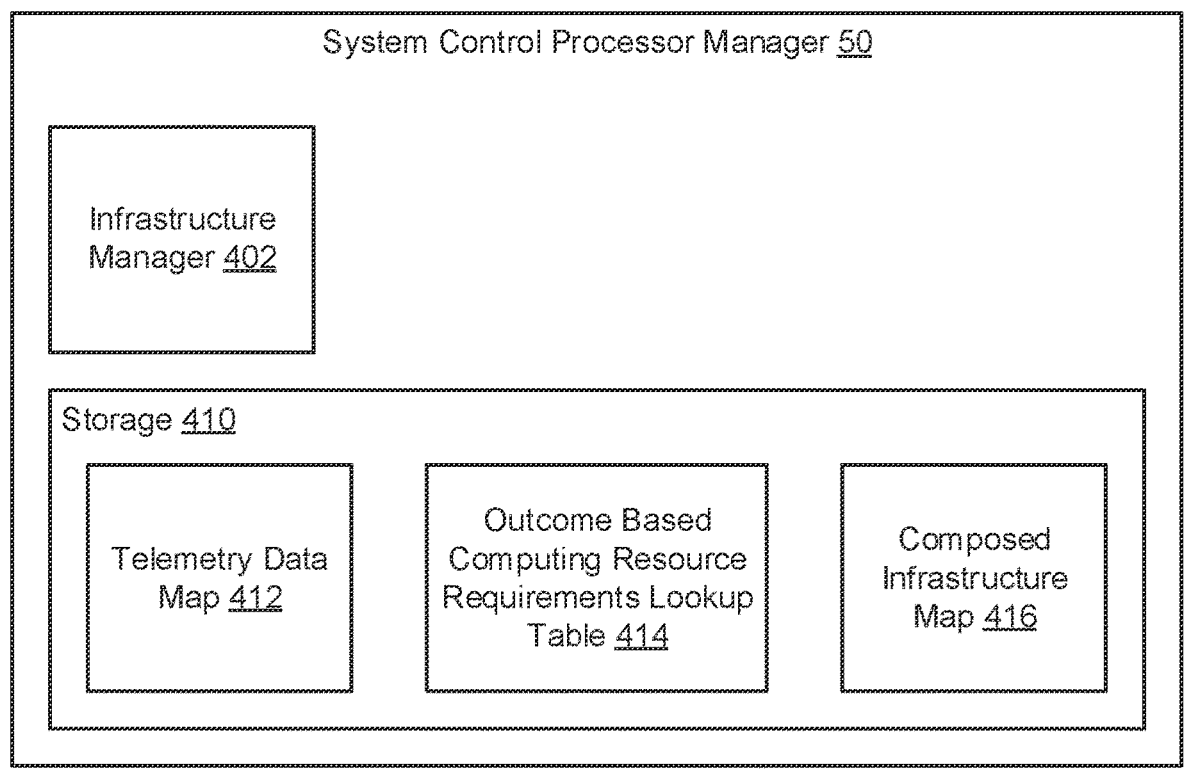
FIG. 4 shows a diagram of a system control processor manager in accordance with one or more embodiments of the invention.

As discussed above, a system control processor manager may cooperate with system control processors of control resource sets to instantiate composed partitions by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed partitions. To do so, the system control processor manager (50) may include an infrastructure manager (402) and storage (410). Each of these components is discussed below.

The infrastructure manager (402) may provide composition services. Composition services may include obtaining partition manifests for composed partitions from clients, determining the resources to allocate to instantiate composed partitions, and cooperating with system control processors to allocate the identified resources. By doing so, the infrastructure manager (402) may cause any number of computer implemented services to be provided using the composed partitions.

To determine the resources to allocate to composed partitions, the infrastructure manager (402) may employ an intent-based model that translates an intent expressed in a partition manifest to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy partition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy partition requests (e.g., instantiate one or more composed partitions to meet the requirements of the partition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed partition. The system control processor may then take action (e.g., prepare the portion of the hardware resource set for presentation to a processor of the compute resource set) in response to the notification.

As composed partitions are instantiated, the infrastructure manager (402) may add information reflecting the resources allocated to composed partitions, the workloads being performed by the composed partitions, and/or other types of information to a composed infrastructure map (416). The infrastructure manager (402) may utilize this information to, for example, decide whether computing resources should be added to or removed from a composed partition. Consequently, computing resources may be dynamically re-provisioned to meet changing workloads imposed on composed partitions.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIG. 5.1.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome-based computing resource requirements lookup table (414) and the composed infrastructure map (416). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed partitions.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed partitions. FIGS. 5.1-5.2 show methods that may be performed by components of the system of FIG. 1.1 to manage composed partitions.

FIG. 5.1 shows a flowchart of a method in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

Turning to FIG. 5.1, in step 500, a partitioning manifest is obtained for one or more composed partitions of a bare metal system (BMS). In one or more embodiments of the invention, the partition manifest specifies partitioning a BMS for the purpose of providing a composed partition. The partition manifest may be obtained using any method without departing from the invention. For example, the partition manifest may be obtained as part of a message from another entity operably connected to a system control processor manager. In another example, the partition manifest may be locally stored in a storage of a system control processor manager.

The partitioning manifest may be a data structure specifying that a composed partition is to be instantiated. As discussed with respect to FIG. 3, the partitioning manifest may be specific (i.e., includes a listing of resources to be allocated to the composed partition) or intent based (i.e., a desired outcome without specifying the resources to be allocated). The composition request may include any type and quantity of information usable to determine how to instantiate a composed partition.

In one or more embodiments of the invention, the partitioning manifest includes a list of computing resources to be allocated to the composed partition. For example, the partitioning manifest may specify computing resources, memory resources, storage resources, graphics processing resources, compute acceleration resources, communications resources, etc. The list may include any type and quantity of computing resources.

In one or more embodiments of the invention, the partitioning request includes a list of applications to be hosted by the composed information handling system. The list may include any type and quantity of applications. For example, the composed partition may be implemented as a para-virtualized operating system. The para-virtualized operation system may utilize any resources in a composed partition to perform the functionality of the para-virtualized operating system.

In one or more embodiments of the invention, the composition request includes a list of applications to be hosted by the composed information handling system. The list may include any type and quantity of applications.

In step 502, at least one BMS having the hardware resources specified by the partitioning manifest is identified. The BMS may be identified by matching the computing resources specified by the partition manifest to at least one BMS having those resources using a resource map (316, FIG. 3). In one or more embodiments, identifying a BMS having the requisite hardware resources of the partitioning request of the partitioning manifest includes identifying a BMS that includes enough available physical partitions to at least meet the requirements set forth in the partitioning manifest when such physical partitions are composed as a composed partition.

As an example, the resource map (316, FIG. 3) may specify a list of compute resource sets, identifiers of control resource sets that manage the listed compute resource sets, and the hardware devices of the listed compute resource sets. By matching the computing resources specified by the composition request to the hardware devices specified in the list, the compute resource set corresponding to the listed hardware devices may be identified as the at least one compute resource set.

As another example, the resource map (316, FIG. 3) may specify the list of BMSs that include the resources that are capable of performing an intent specified in the partitioning manifest because, for example, the BMSs include available physical partitions having the specified resources.

In step 504, a partitioning request is sent to a SCP of the information handling system hosting the identified BMS. In one or more embodiments, the partitioning request is sent to the SCP by the SCP manager, and is based on the partitioning manifest. In one or more embodiments of the invention, the partition request specifies the resources needed to provide the composed partition of the partitioning manifest. The partitioning request may further specify providing one or more physical partitions of the identified BMS for the execution of the composed partition.

FIG. 5.2 shows a flowchart of a method in accordance with one or more embodiments of the invention. The method shown in FIG. 5.2 may be performed by, for example, an application instance executing on a compute resource set (e.g., 102, FIG. 1.2). Other components of the system in FIGS. 1.1-3 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

Turning to FIG. 5.2, in step 520, a partitioning request is obtained from a SCP manager. The partitioning request may be one discussed in step 504 of FIG. 5.1. The partition request may be obtained using any method without departing from the invention. For example, the partition request may be obtained as part of a message from the system control processor manager operably connected to the system control processor of an information handling system. In another example, the partition request may be locally stored in a storage of a system control processor.

In step 522, a partitioning configuration data structure is used to identify one or more physical partitions of a BMS, of the information handling system, capable of servicing the partitioning request. As discussed above, the partitioning request may specify a list of resources required to execute a composed partition of the partitioning request. The system control processor may use the partitioning configuration data structure to determine any one or more physical partitions that are: (i) available to be allocated to the composed partition (e.g., not already allocated to another composed partition), and (ii) collectively include the required resources for the composed partition.

In step 524, management services for the composed partition are set up using the identified physical partitions to obtain partitions. The management services may include, for example, virtualization, emulation, abstraction, indirection, and/or other type of services to meet the requirements of data integrity, security, and/or management models. The system control processor may provide management services to the physical partitions identified in step 522.

To setup the management services, the system control processor manager may cooperate with the at least one control resource set. For example, the system control processor manager may generate instructions for implementing the management services, encapsulate the instructions in a message, and send the message to one or more system control processors of the at least one control resource set. In response to receiving the message, the system control processors may implement the instructions thereby implementing any number of management services such as virtualization, emulation, etc.

Setting up management services for the hardware resource set may include, for example, preparing translation, indirection, or abstraction tables used to translate logical addresses provided by compute resource sets to physical addresses utilized by hardware devices of the physical partitions.

In another example, setting up management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up management services may further include modifying the operation of one or more devices to provide, for example, data integrity functionality (e.g., RAID, ECC, etc.), security functionality (e.g., encryption), and/or other functionalities that are transparent to the composed information handling system.

In step 526, the partitioning configuration data structure is updated based on the composed partitions. In one or more embodiments of the invention, the partitioning configuration data structure is updated to specify the allocation of the physical partitions to the composed partition. Specifically, the partition configuration data structure may be updated to specify the composed partition and the physical partitions allocated to the composed partition. The partition configuration data structure may further specify the configuration of the memory bounds allocated to the composed partition. Other configuration information may be updated in the partitioning configuration data structure without departing from the invention.

In one or more embodiments of the invention, following the allocation of the physical partitions to the composed partition, the composed partition is implemented using the updated partition configuration data structure. Specifically, the implementation may include obtaining data processing requests (e.g., read requests or write requests) from an entity (e.g., a client) utilizing the composed partition, and managing the utilization of the computing resources in the physical partitions to service the data processing requests. Such utilization may include, for example, processing, by a processor of a physical partition allocated to the composed partition, of data specified in the data processing request, and storing the processed data in a storage device of a physical partition allocated to the composed partition. The data processing request may be serviced in other ways using the resources of the physical partitions of the composed partition without departing from the invention.

Example

The following section describes an example in accordance with one or more embodiments of the invention. The example is not intended to limit the scope of the invention.

Turning to the example, consider a scenario as illustrated in FIG. 6.1, in which a bare-metal system (BMS) of an information handling system (not shown in FIG. 6.1) includes a set of BMS (600) resources. The BMS resources (600) includes two physical partitions (physical partition A (610) and physical partition B (630)). Physical partition A (610) includes a core group that includes processor core A (611), processor core B (612), processor core C (613), processor core D (614). The core group utilizes L2 cache E (615) to store data so that it is more readily accessible to the processor cores (611, 612, 613, 614). Physical partition A (610) further includes a memory controller F (616) that utilizes memory pools G (617), memory pool H (618), memory pool J (619), and memory pool K (620). Finally, physical partition A (610) further includes storage device L (621).

Physical partition B (630) includes a second core group that includes processor core M (631), processor core N (612), processor core O (613), processor core P (634). The core group utilizes L2 cache Q (635) to store volatile memory easily accessible to the processor cores (631, 632, 633, 634). Physical partition B (630) further includes a memory controller R (636) that utilizes memory pools S (637), memory pool T (638), memory pool U (639), and memory pool V (640). Finally, physical partition B (630) further includes storage device W (641).

Each resource in a physical partition (610, 630) is electrically connected such that direct communication between the resources within the partition (610, 620) occurs. This enables multiple processes to be performed by a physical partition (610, 630). In this example, neither physical partition (610, 630) has been allocated to a composed partition.

Turning to FIG. 6.2, consider a scenario in which a client (602), at step 1, sends a partitioning manifest to a system control processor manager (604) that manages four information handling systems (IHSs) (642, 650, 660, 670). The partitioning manifest specifies utilizing computing resources to provide a virtual environment that includes a hypervisor and eight virtual machines.

In response to the partition manifest, the system control processor manager (604), at step 2, analyzes the known computing resources of the IHSs (642, 650, 660, 670) to determine that IHS B includes the available resources to service the application manifest. Based on this analysis, the system control processor manager (604), at step 3, sends a partitioning request to a system control processor (674) of IHS B (670) that specifies partitioning the BMS (600) to provide the resources to instantiate a hypervisor with eight virtual machines. At step 4, the system control processor (674) performs the method of FIG. 6.2 to determine that the physical partitions in the BMS (600) are capable of servicing the partitioning request. Based on this determination, the physical partitions (610, 630, FIG. 6.1) of the BMS (600) are allocated to a composed partition in which the virtual environment may be instantiated.

Following the allocation, in step 5, the partition configuration data structure (676) is updated to specify the configuration of the composed partition. Specifically, the partitioning configuration data structure is updated to specify the memory bounds of the composed partition, the configuration of a memory management unit to specify usage of the memory bounds during operation of the composed partition. Further, the partition configuration data structure specifies the core groups of the two physical partitions to be used to execute the virtual environment.

End of Example

Thus, as illustrated in FIGS. 6.1-6.2, embodiments of the invention may provide a system that enables improved computer implemented services to be provided using dynamically instantiated composed partitions via efficient computing resource allocation.

Figure 7:
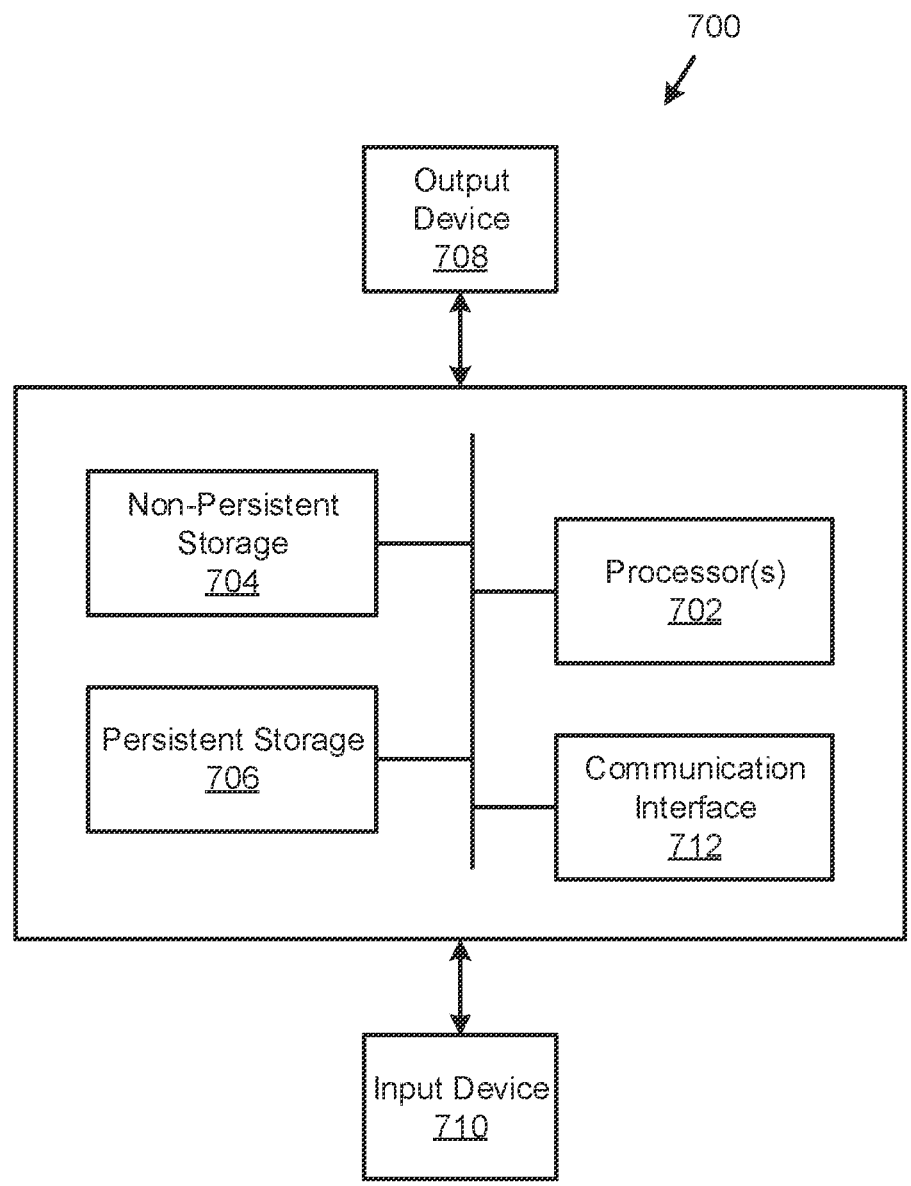
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for managing resource allocation of physical partitions found in a bare-metal system. Embodiments of the invention enable a system control processor managing the bare-metal system to utilize a partitioning configuration data structure to manage the allocation of the physical partitions for servicing of the composed partitions. The management may include looking at the bounded resources of the bare-metal system to limit servicing of data processing requests associated with the composed partition to determine the resources allocated to the servicing of the data processing requests, and enabling such resources to service the requests. In this manner, the resources may be partitioned to provide any number of virtual environments and/or emulations in a bare-metal system.

Thus, embodiments of the invention may address the problem of resource allocation for composed systems. For example, by utilizing a system control processor manager, the limited resources of multiple information handling systems may be efficiently allocated to provide desired computer implemented services.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system for providing bare-metal system (BMS) resource partitioning, comprising:
   a system control processor;
   a BMS;
   a partitioning configuration data structure; and
   a system control processor manager,
   wherein the system control processor manager is programmed to:
      receive a partitioning manifest, wherein the partitioning manifest is based on intent;
      using the intent of the partitioning manifest, identify the BMS as having hardware resources to service the partitioning manifest;
      based on the identifying, send a partitioning request to a system control processor of the BMS that specifies a composed partition,
   wherein the system control processor is programmed to:
      receive the partitioning request;
      in response to the partitioning request:
         identify a set of physical partitions of the BMS that are capable of servicing the partitioning request based on the composed partition;
         update the partitioning configuration data structure based on the set of physical partitions and the composed partitions,
         wherein the partitioning configuration data structure comprises a partition entry that specifies:
            the composed partition,
            the set of physical partitions allocated to the composed partition,
            memory bounds for the composed partition, and
            configuration of a memory management unit to specify usage of the memory bounds during operation of the composed partition; and
         implement the composed partition based on the set of physical partitions using the partition entry of the partitioning configuration data structure.

2. The system of claim 1, wherein implementing the composed partition comprises:
   obtaining, by the system control processor, a data processing request corresponding to the composed partition;
   identifying the composed partition using the partitioning configuration data structure; and
   servicing the data processing request using the set of physical partitions.

3. The system of claim 2, wherein the data processing request specifies: processing data to obtain processed data using a processor of the set of physical partitions, and storing the processed data in a storage device of the set of physical partitions.

4. The system of claim 1, wherein a physical partition of the set of physical partitions comprises at least one of: a set of processor cores, a memory controller, and a storage device.

5. The system of claim 1, wherein the BMS comprises a second physical partition, and wherein the composed partition does not comprise the second physical partition.

6. A method for providing computer implemented services using information handling systems, comprising:
   receiving, by a system control processor manager, a partitioning manifest, wherein the partitioning manifest is based on intent;
   using the intent of the partitioning manifest, identifying a bare-metal system (BMS) as having hardware resources to service the partitioning manifest;
   based on the identifying, sending a partitioning request to a system control processor of the BMS that specifies a composed partition;
   receiving, by the system control processor, the partitioning request;
   in response to the partitioning request:
      identifying a set of physical partitions of a bare-metal system (BMS) that are capable of servicing the partitioning request based on the composed partition;
      updating a partitioning configuration data structure based on the set of physical partitions and the composed partition,
      wherein the partitioning configuration data structure comprises a partition entry that specifies:
         the composed partition,
         the set of physical partitions allocated to the composed partition, memory bounds for the composed partition, and
         configuration of a memory management unit to specify usage of the memory bounds during operation of the composed partition; and
      implementing the composed partition based on the set of physical partitions using the partition entry of the partitioning configuration data structure.

7. The method of claim 6, wherein implementing the composed partition comprises:
   obtaining, by the system control processor, a data processing request corresponding to the composed partition;

identifying the composed partition using the partitioning configuration data structure; and servicing the data processing request using the set of physical partitions.

8. The method of claim 7, wherein the data processing request specifies: processing data to obtain processed data using a processor of the set of physical partitions, and storing the processed data in a storage device of the set of physical partitions.

9. The method of claim 6, wherein a physical partition of the set of physical partitions comprises at least one of: a set of processor cores, a memory controller, and a storage device.

10. The method of claim 6, wherein the BMS comprises a second physical partition, and wherein the composed partition does not comprise the second physical partition.

11. A non-transitory computer readable medium comprising computer readable program code, which when executed by a computer processor enables the computer processor to perform a method for dynamically instantiating composed partitions, the method comprising:

receiving, by a system control processor, a partitioning request from a system control processor manager that specifies a composed partition, wherein the partitioning request is generated by the system control processor in response to receiving a partitioning manifest, wherein the partitioning manifest is based on intent, and wherein the intent is used to identify a bare-metal system (BMS) as having hardware resources to service the partitioning manifest;

in response to the partitioning request:

identifying a set of physical partitions of the BMS that are capable of servicing the partitioning request based on the composed partition;

updating a partitioning configuration data structure based on the set of physical partitions and the composed partition, wherein the partitioning configuration data structure comprises a partition entry that specifies:

the composed partition, the set of physical partitions allocated to the composed partition, memory bounds for the composed partition, and configuration of a memory management unit to specify usage of the memory bounds during operation of the composed partition; and implementing the composed partition based on the set of physical partitions using the partition entry of the partitioning configuration data structure.

12. The non-transitory computer readable medium of claim 11, wherein the system control processor is further programmed to:

wherein implementing the partition comprises:

obtaining, by the system control processor, a data processing request corresponding to the partition;

identifying the partition using the partitioning configuration data structure; and servicing the data processing request using the set of physical partitions.

13. The non-transitory computer readable medium of claim 12, wherein the data processing request specifies: processing data to obtain processed data using a processor of the set of physical partitions, and storing the processed data in a storage device of the set of physical partitions.

14. The non-transitory computer readable medium of claim 11, a physical partition of the set of physical partitions comprises at least one of: a set of processor cores, a memory controller, and a storage device.

15. The non-transitory computer readable medium of claim 11, wherein the BMS comprises a second physical partition, and wherein the composed partition does not comprise the second physical partition.

* * * * *